(12) United States Patent
Proctor et al.

(10) Patent No.: US 6,185,925 B1
(45) Date of Patent: Feb. 13, 2001

(54) EXTERNAL COOLING SYSTEM FOR TURBINE FRAME

(75) Inventors: Robert Proctor, West Chester; Michael J. Epstein, Mason; Gordon G. Fraser, Cincinnati; Scott E. Farley, Kings Mills; Richard F. Koch, Loveland, all of OH (US); Robert W. Siebert, Troy, MI (US)

(73) Assignee: General Electric Company, Cincinnati, OH (US)

( * ) Notice: Under 35 U.S.C. 154(b), the term of this patent shall be extended for 0 days.

(21) Appl. No.: 09/249,206

(22) Filed: Feb. 12, 1999

(51) Int. Cl.$^7$ ........................................... F02C 3/00
(52) U.S. Cl. .................... 60/39.75; 415/177; 415/178
(58) Field of Search .................. 60/39.75, 39.83, 60/39.07, 266; 415/175, 176, 177, 178

(56) References Cited

U.S. PATENT DOCUMENTS

| | | |
|---|---|---|
| 4,019,320 | 4/1977 | Redinger, Jr. et al. . |
| 4,034,558 * | 7/1977 | Korta et al. ..................... 60/39.75 X |
| 4,069,662 * | 1/1978 | Redinger, Jr. et al. ......... 60/39.75 X |
| 4,279,123 | 7/1981 | Griffin et al. . |
| 4,412,782 * | 11/1983 | Monsarrat ............................ 415/175 |
| 4,525,998 * | 7/1985 | Schwarz ........................... 415/178 X |
| 4,762,462 * | 8/1988 | Lardellier .............................. 415/177 |
| 4,965,994 | 10/1990 | Ciokajlo et al. . |
| 4,967,552 | 11/1990 | Kumata et al. . |
| 4,989,406 | 2/1991 | Vdoviak et al. . |
| 5,100,291 | 3/1992 | Glover . |
| 5,134,844 | 8/1992 | Lee et al. . |
| 5,205,115 | 4/1993 | Plemmons et al. . |
| 5,219,268 | 6/1993 | Johnson . |
| 5,275,357 | 1/1994 | Seelen et al. . |
| 5,303,880 | 4/1994 | Cencula et al. . |
| 5,385,013 * | 1/1995 | Barron et al. .................. 60/39.75 X |
| 5,399,066 * | 3/1995 | Ritchie et al. ................... 415/176 X |
| 5,452,575 | 9/1995 | Freid . |
| 5,483,792 * | 1/1996 | Czachor et al. ............... 60/39.75 X |
| 5,540,547 | 7/1996 | Cole . |
| 6,035,929 * | 3/2000 | Friedel et al. .................. 415/175 X |

* cited by examiner

*Primary Examiner*—Timothy S. Thorpe
*Assistant Examiner*—David J. Torrente
(74) *Attorney, Agent, or Firm*—Andrew C. Hess; Nathan D. Herkamp (57) ABSTRACT

An apparatus for cooling a gas turbine engine annular rear turbine frame includes a first plenum box having an inlet for receiving cooling air and an annular first manifold tube in fluid communication with a first outlet of and extending in a first circumferential direction away from the plenum box. The first manifold tube is circumscribed radially outward of and around a centerline and has axially spaced apart first arcuate sections circumscribed about and perpendicular to the centerline. Each of the first arcuate sections of the first manifold tube has a corresponding portion of a first plurality of impingement cooling holes disposed through the first manifold tube and aimed generally radially inward. In one embodiment the impingement cooling holes are aimed towards a first circumference on the frame and A cooling air bleed is preferably connected to the plenum box with a selectable on and off control valve therebetween.

20 Claims, 9 Drawing Sheets

EXTERNAL COOLING SYSTEM FOR TURBINE FRAME

BACKGROUND OF THE INVENTION

1. Field of the Invention

This invention relates generally to external cooling of turbine casings and flanges and, more particularly, to external cooling of low pressure turbine frames.

2. Discussion of the Background Art

Gas turbine engines, such as the General Electric CFM56-5B and -7B with dual annular combustors (DAC) engines, have been designed to operate both efficiently and with low amounts of pollution emissions. As a consequence, such engines have historically operated at very high EGT (Exhaust Gas Temperature) levels under ground idle and low power conditions. The turbine rear frame (TRF) and various nacelle components may experience temperatures that are high enough such that the mechanical properties of the materials are reduced and no longer acceptable from a fatigue and/or from an ultimate strength standpoint. To reduce these high temperatures, the present invention incorporates an external cooling manifold assembly capable of supplying sufficient cooling to this region of the engine such that temperature operating limits will be met or exceeded at all points of the flight mission.

Low pressure turbine (LPT) active clearance control systems which use an external manifold system to impinge fan discharge air on the LPT case have long been used for the purposes of maintaining desirable tip clearances between rotating turbine blades and respective surrounding shrouds, see U.S. Pat. No. 4,019,320, entitled "External Gas Turbine Engine Cooling For Clearance Control" as an example. Also long known in the art is external cooling of the engine case for the purposes of thermal control. Such cooling heretofore has been by flowing fan air over the casing during part or the entire engine operation.

The problem is particularly more acute for the rear turbine frame which typically supports the bearing assembly which supports the low pressure rotor and which contains the lugs through which pins are disposed to mount the engine to an aircraft pylon.

SUMMARY OF THE INVENTION

Briefly, in accordance with one aspect of the present invention, an apparatus for cooling a gas turbine engine annular turbine frame includes a first plenum box having an inlet for receiving cooling air and an annular first manifold tube in fluid communication with a first outlet of and extending in a first circumferential direction away from the plenum box. The first manifold tube is circumscribed radially outward of and around a centerline and has axially spaced apart first arcuate sections circumscribed about and perpendicular to the centerline. Each of the first arcuate sections of the first manifold tube has a corresponding portion of a first plurality of impingement cooling holes disposed through the first manifold tube and aimed generally radially inward. In one embodiment of the present invention, the first plurality of impingement cooling holes includes at least one set of impingement cooling holes disposed along a first set of arcs wherein each of the first arcs lay on one of the first arcuate sections. At least one additional set of impingement cooling holes may be disposed along at least one additional set of arcs such that each of the additional arcs lay on the one of the first arcuate sections axially spaced apart from the first arc. Preferably, the at least one set of impingement cooling holes are aimed towards a first circumference on the frame and the at least one additional set of impingement cooling holes are aimed towards a second circumference on the frame. A cooling air bleed is preferably connected to the plenum box with a selectable on and off control valve therebetween. In another particular embodiment of the invention, the cooling air bleed is in fluid communication with at least one stage of a compressor of the engine.

In another embodiment, an annular second manifold tube in fluid communication with a second outlet of the plenum box extends in a second circumferential direction away from the plenum box and is circumscribed radially outward of and around the centerline and axially spaced apart from and aft of the first manifold tube. The second manifold tube has axially spaced apart second arcuate circumscribed about and perpendicular to the centerline and each of the second arcuate sections of the second manifold tube has a corresponding portion of a second plurality of impingement cooling holes disposed through the second manifold tube and aimed generally radially inward. First and second portions of the first and second pluralities of impingement cooling holes are aimed at first and second axially spaced apart circles respectively around the frame and the first and second portions of the first and second pluralities of impingement cooling holes are in at least two of the first and second arcuate sections, respectively. Preferably, a counter flow means is used to flow cooling air in the first and second manifold tubes in opposite first and second circumferential directions, respectively. Preferably, the first and second manifold tubes are nearly 360 degrees in circumference and extend circumferentially from first and second outlets in the plenum box to first and second manifold tube ends, respectively, near the plenum box. The counter flow means may include the first and second outlets being circumferentially spaced apart in circumferentially opposite sides of the plenum box.

ADVANTAGES OF THE INVENTION

The present invention increases the effective usefulness of high operating temperature combustors by providing an effective cooling system and apparatus for cooling a turbine rear frame of a gas turbine engine. The cooling manifold system of the present invention may be an optional feature of the engine and does not have to be used on all engine models. It provides sufficient cooling capability to operate the engine within the limits imposed by various customers and even under hot day, fully deteriorated, fully loaded conditions.

The cooling system and its manifold arrangement of the present invention has a minimal impact on other engine systems. The fuel burn impact is negligible and does not negatively effect the engine's fuel efficiency. The invention has little impact on the weight of the engine. In summary, the turbine rear frame cooling apparatus of the present invention provides a light-weight fuel efficient design for aircraft gas turbine engines which is particularly useful for such engines with constructed high temperature highly fuel efficient combustors which provides an overall increase in the fuel efficiency of the entire engine.

BRIEF DESCRIPTION OF THE DRAWINGS

The novel features believed characteristic of the present invention are set forth and differentiated in the claims. In the drawings as hereinafter described, a preferred embodiment is depicted; however, various other modifications and alternate constructions can be made thereto without departing from the true spirit and scope of the invention. The invention, together with further objects and advantages thereof, is more particularly described in conjunction with the accompanying drawings in which:

DETAILED DESCRIPTION

Figure 1:
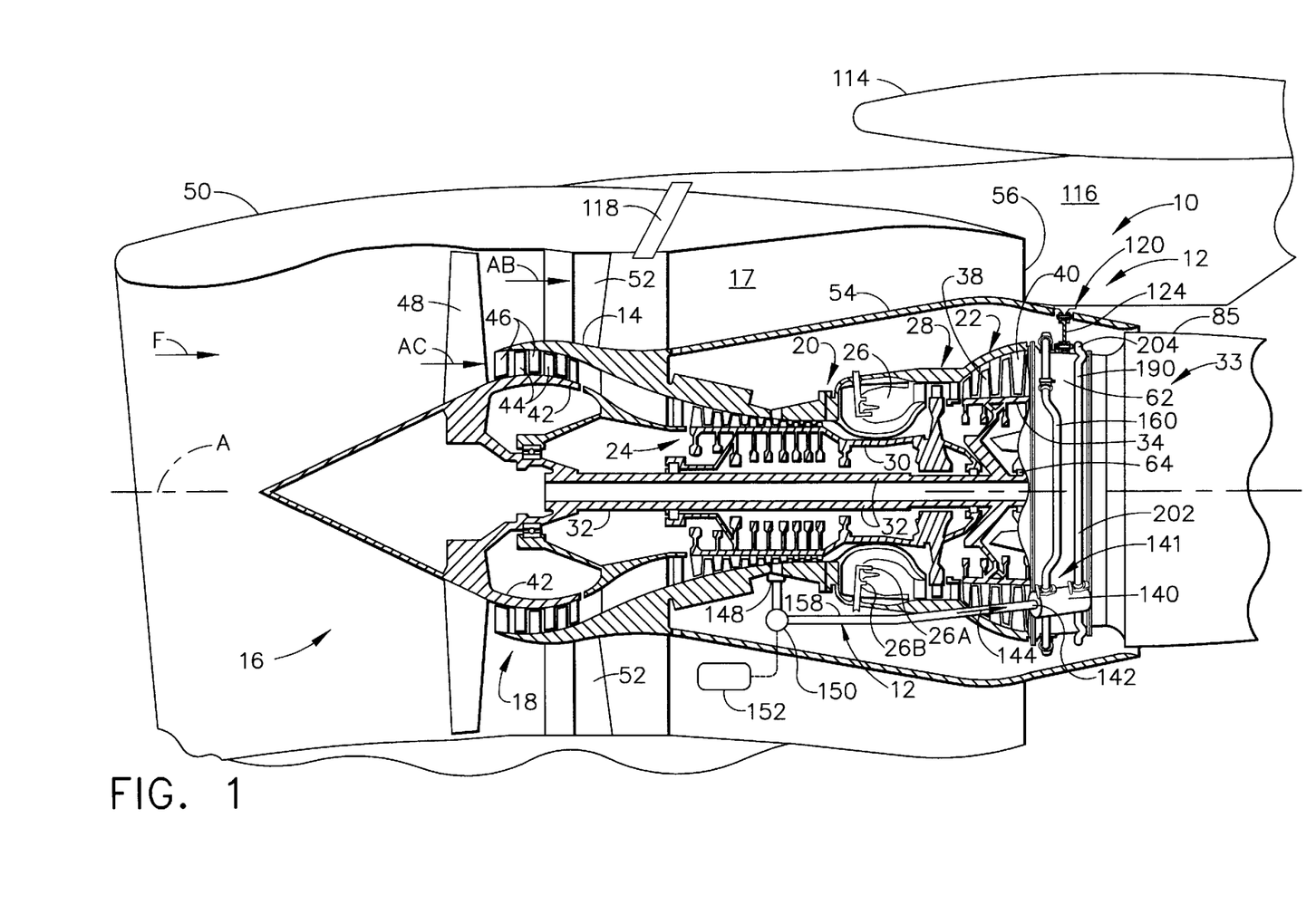
FIG. 1 is a schematic cross-sectional view of a gas turbine engine having a rear turbine frame cooling system and mounted to a pylon below an aircraft wing by an aft engine mount in accordance with one exemplary embodiment of the present invention.
Figure 1A:
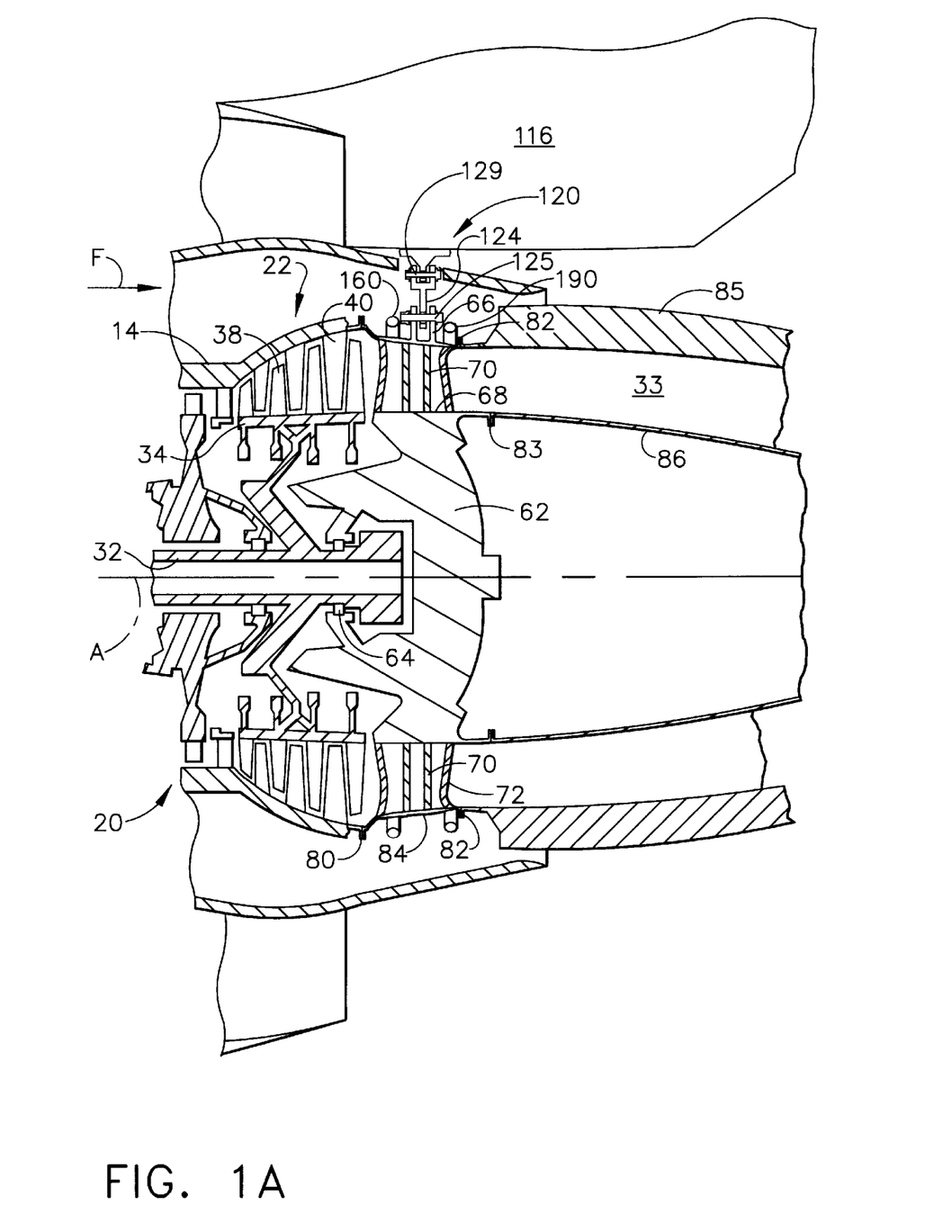
FIG. 1A is an enlarged cut-away schematic view of a portion of the engine illustrated in FIG. 1, including a rear turbine frame and primary nozzle.

Referring now to the drawings, and particularly to FIGS. 1 and 1A, there is illustrated a gas turbine engine, generally designated 10, to which is applied one embodiment of a turbine rear frame cooling system 12 in accordance with the present invention. The engine 10 has a longitudinal centerline A and an annular casing 14 disposed coaxially and concentrically about the centerline A. Air enters the engine 10 in a downstream axial direction F through a forward fan 16 and is then split into fan bypass air AB through a fan bypass 17 and core air AC through a booster compressor 18 (also referred to as the low pressure compressor). A core engine 20 receives the core air from the AC booster compressor 18 and send it through a multi-stage high pressure compressor 24, a dual annular combustor 26, with radially inner and outer rows of fuel injectors 26A and 26B, respectively, and a high pressure turbine 28, either single or multiple stage, all arranged coaxially about the centerline A of the engine 10 in a serial flow relationship. A high pressure shaft 30 fixedly interconnects the high pressure compressor 24 and high pressure turbine 28 of the core engine 20. The high pressure compressor 24 is rotatably driven by high pressure turbine 28 to compress air entering the core engine 20 to a relatively high pressure. This high pressure air is then mixed with fuel in the combustor 26 and ignited to form a high energy gas stream. This gas stream flows aft and passes through the high pressure turbine 28, rotatably driving it and the high pressure shaft 30 of the core engine 20 which, in turn, rotatably drives the multi-stage high pressure compressor 24.

The gas stream discharged by the core engine high pressure turbine 28 is expanded through a low pressure turbine 22 (LPT) which drives the forward fan 16 and the booster compressor 18 via a low pressure shaft 32 which extends forwardly through the annular high pressure shaft 30. Some thrust is produced by the residual gas stream exiting the core engine 20 through a core engine or primary nozzle 33 aft of low pressure turbine 22 but most of the thrust produced is generated by the forward fan 16.

The low pressure turbine 22 includes an annular rotatable low pressure turbine rotor 34 having a plurality of turbine blade rows 38 extending radially outwardly therefrom and axially spaced from one another. A plurality of stator vane rows 40 are fixedly attached to and extend radially inwardly from the stationary casing 14. The stator vane rows 40 are axially spaced so as to alternate with the turbine blade rows 38 and define therewith multiple stages of the low pressure turbine 22.

The booster compressor 18 is driven by the low pressure turbine 22 via the low pressure shaft 32. The booster compressor 18 includes a booster rotor 42 and a plurality of low pressure compressor or booster blade rows 44 fixedly attached to and extending radially outwardly from the booster rotor 42 for rotation therewith. A plurality of booster stator vane rows 46 are fixedly attached to and extend radially inwardly from the stationary casing 14. Both the booster blade rows 44 and the booster stator vane rows 46 are axially spaced and so arranged to alternate with one another.

The booster rotor 42 also supports a fan blade row 48 of the forward fan 16. The fan blade row 48 is housed within a nacelle 50 of the engine 10 supported about the stationary casing 14 by a plurality of radially extending and circumferentially spaced fan struts 52. An engine cowling 54 which encloses the core engine 20 and the low pressure turbine 22 is disposed within and extends coaxially with a rear portion of the nacelle 50 so as to define therewith a fan discharge nozzle 56. Most of the thrust produced by the engine 10 is generated by air flow caused by rotation of the fan blade row 48 of the forward fan 16, which air flow passes over and through the nacelle 50.

The low pressure turbine 22 includes an annular rear turbine frame 62 which supports a conventional bearing 64 which, in turn, rotatably supports an aft end of the low pressure shaft 32. The rear turbine frame 62 includes a radially outer first structural ring 66 disposed coaxially about the centerline A and a radially inner second structural ring 68, often referred to as a hub, disposed coaxially within the first structural ring 66. The bearing 64 is mounted within the radially inner second structural ring 68. A plurality of circumferentially spaced apart struts 70 extend radially between the first and second structural rings 66 and 68 and are fixedly joined thereto. Each one of the struts 70 is conventionally surrounded by a conventional fairing 72 for protecting the struts from the combustion gases which flow through the turbine frame 62.

Figure 5:
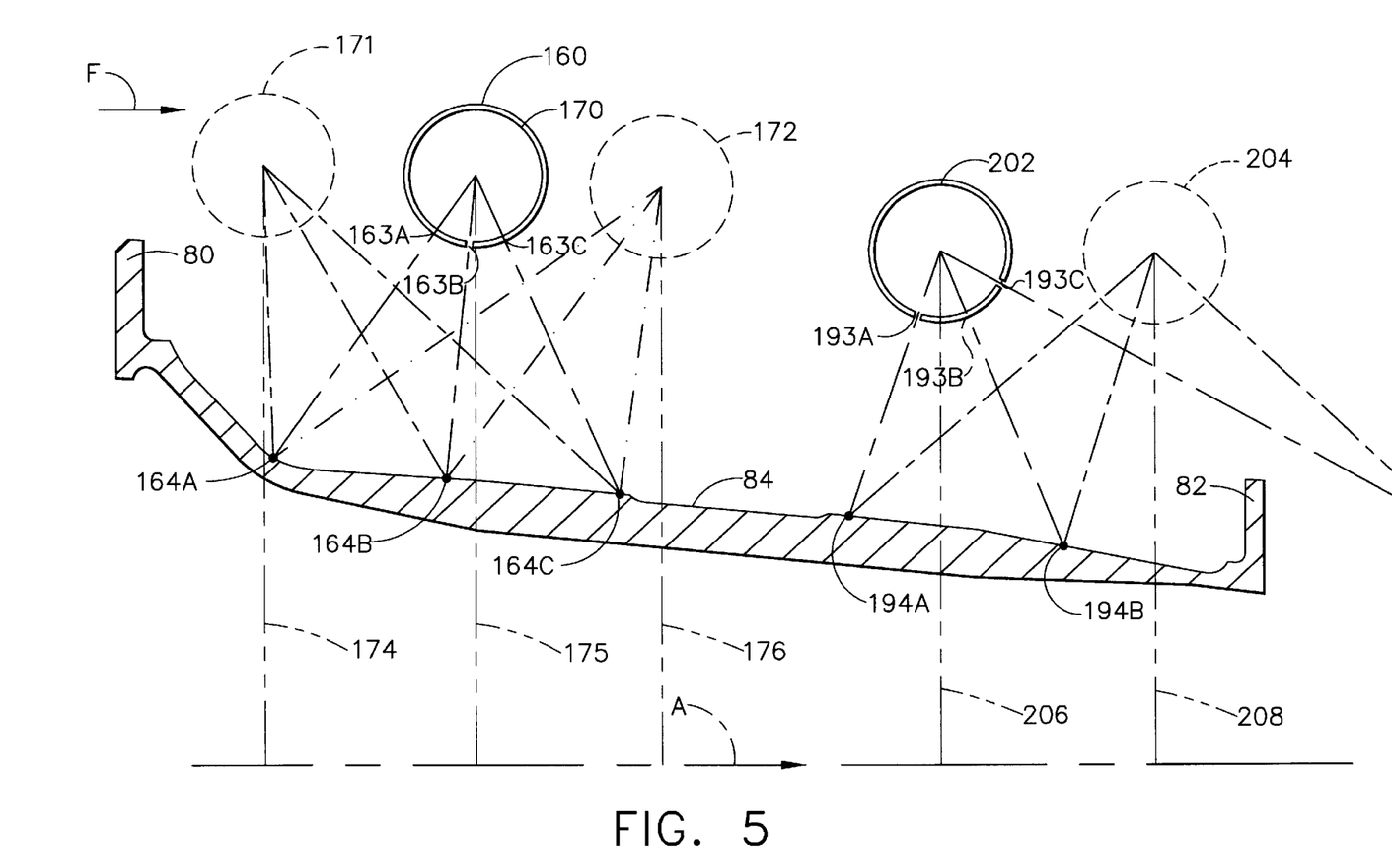
FIG. 5 is a schematic illustration of positions of forward and aft manifold tubes of the cooling manifold in FIGS. 2 and 3 with respect to a radially outer first structural ring of the rear turbine frame in FIGS. 1 and 1A.
Figure 5A:
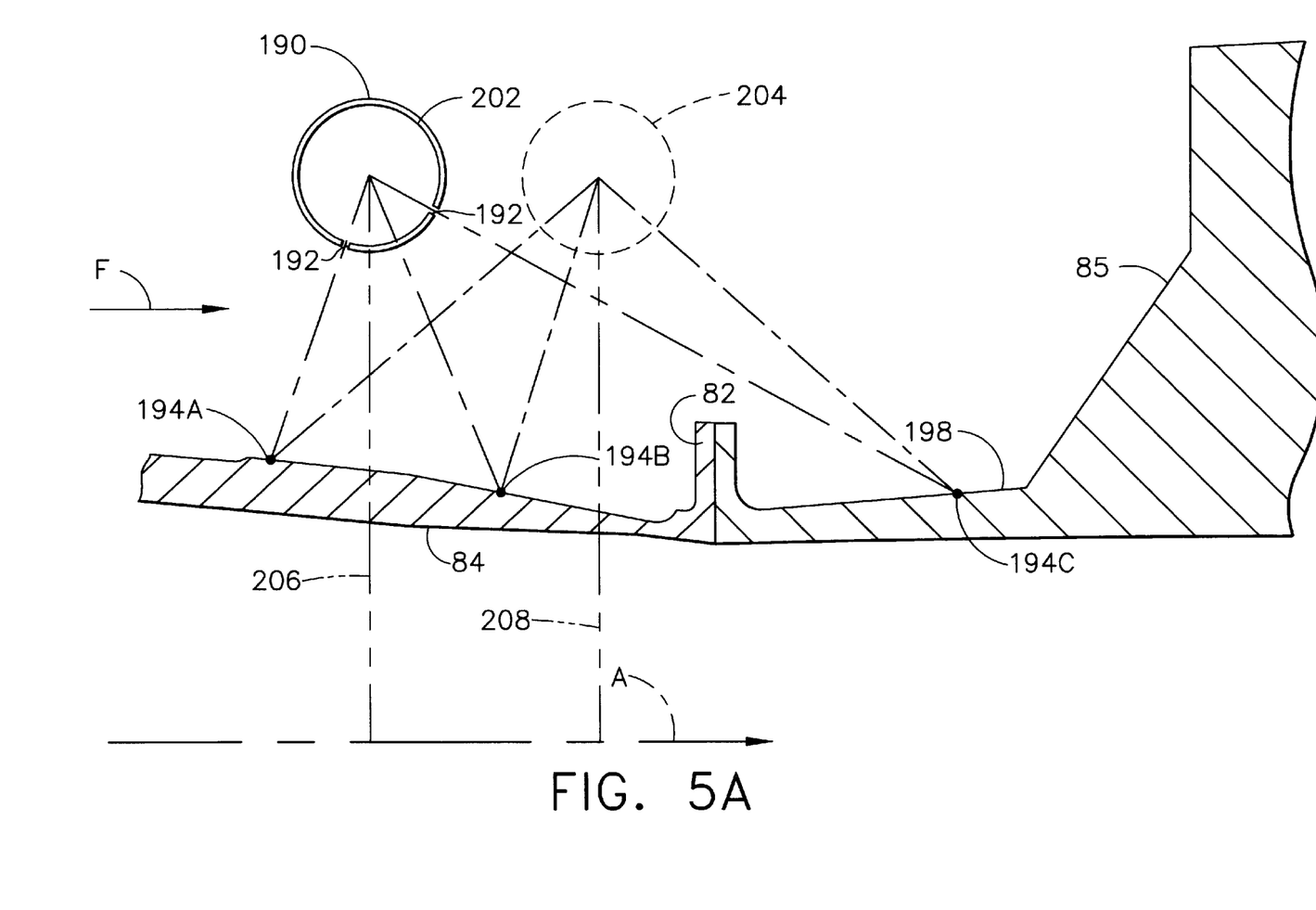
FIG. 5A is a schematic illustration of positions of the aft manifold tubes in FIG. 5 and a nozzle cowl attached to the outer first structural ring in FIG. 5.

The first structural ring 66 has an annular forward flange 80 and an annular aft flange 82 with an annular frame casing 84 extending therebetween (see FIG. 5 for more detail). The primary nozzle 33 is defined by a nozzle cowl 85 and a plug or centerbody 86. The nozzle cowl 85 is bolted or otherwise connected to the aft flange 82 and the centerbody 86 is bolted or otherwise connected to an inner flange 83 of the radially inner second structural ring 68. During certain operating conditions, the first structural ring 66 and at least a forward portion of the nozzle cowl 85 may get hotter than desired causing a reduction in component life for those parts which are overheated. The turbine rear frame cooling system 12 of the present invention is designed to cool the first structural ring 66 and at least the forward portion of the nozzle cowl 85.

As illustrated in FIG. 1, the engine 10 is mounted below an aircraft wing 114 by a pylon 116 at a conventional forward mount 118, shown in dashed line, and an aft mount 120 spaced axially downstream from the forward mount 118. The aft mount 120 fixedly joins the rear turbine frame 62 of the engine 10 to a platform 124 which is fixedly joined to the pylon 116. The aft mount 120 includes a circumferentially spaced apart conventional first set of U-shaped clevises 122 on the rear turbine frame 62 connected by a first set of pins 125 to a set of first links 126. Each of the first links 126 has second clevises 123 connected by a second set of pins 129 to lugs 127 that depend radially inward from the platform 124.

Cooling the first structural ring 66 and the rear turbine frame 62 is complicated by various features on the frame such as the aft mount 120 and, in particular, the first U-shaped clevises 122 and the first link 126. It is highly desirable to evenly cool the first structural ring 66 in the circumferential direction in order to minimize thermal stresses due to variations in temperature around the ring.

The turbine rear frame cooling system 12, in accordance with an exemplary embodiment of the present invention for cooling the gas turbine engine rear turbine frame 62, includes at least one cooling manifold 141 surrounding the rear turbine frame. The cooling manifold 141 preferably has at least one plenum box 140 with an inlet 142 for receiving cooling air 144 from a compressed air source on the engine such as a fifth stage compressor bleed manifold 148. The cooling system of the present invention may be constructed without a plenum box by having one or more cooling manifolds in fluid communication with the compressed air source on the engine. Other sources of cooling air such as fan air may be used. A preferably selectable on and off control valve 150, controlled by a controller 152, meters and controls the cooling air 144 taken from the compressor bleed manifold 148 and delivered through a cooling air pipe 158 to the inlet 142. The controller 152 is preferably a full authority digital electronic controller, referred to as a FADEC by those in the industry, and is used to shut off the flow at off-idle conditions where external cooling is unnecessary. The valve can also be scheduled to meter the flow at other points in the mission as needed. The plenum box 140 serves to convert the dynamic pressure of the cooling air 144 to static pressure. The controller 152 is used to control the cooling system 12 which typically operated under ground idle and low power conditions to maintain EGT (Exhaust Gas Temperature) levels at acceptable low levels.

Figure 2:
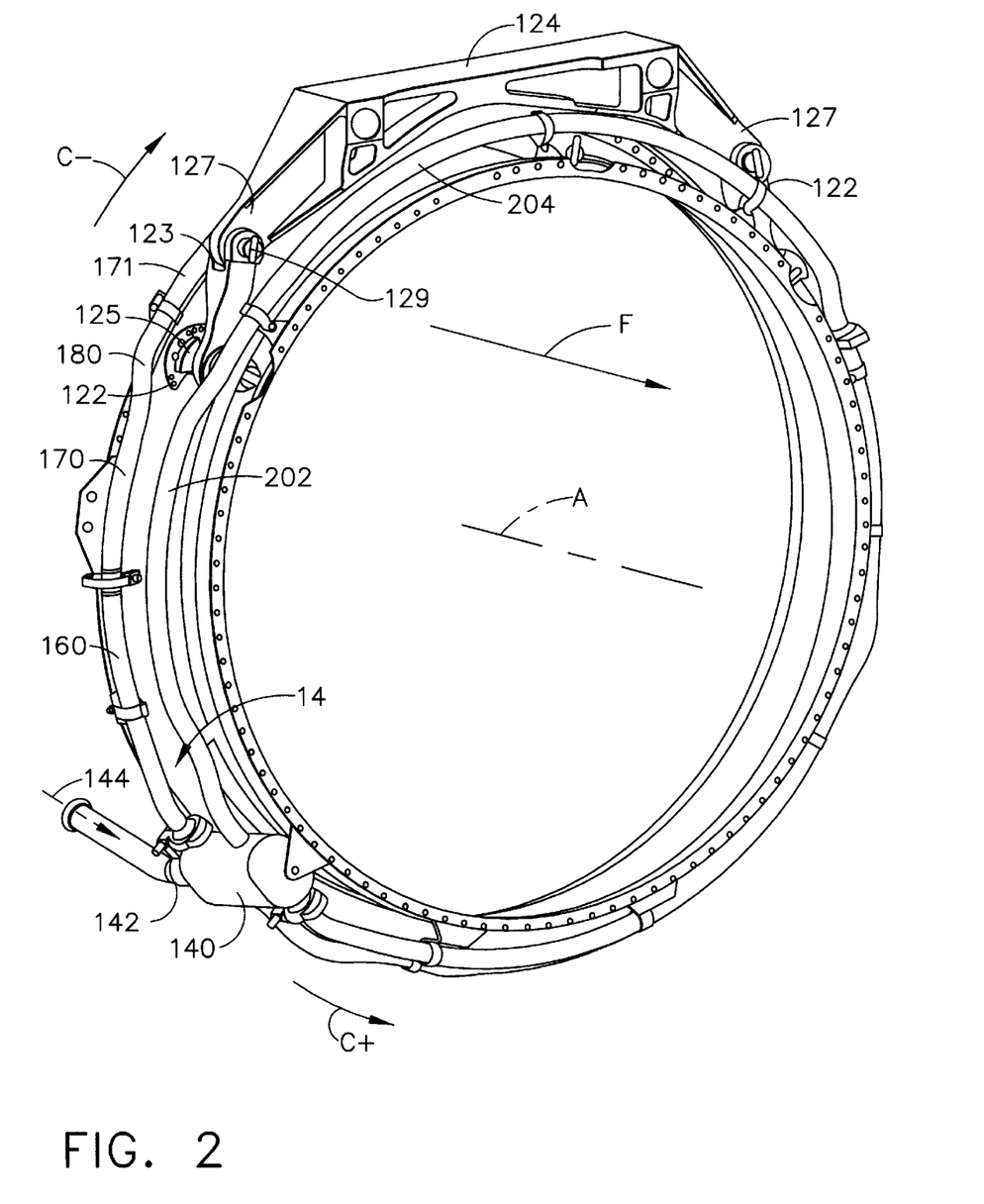
FIG. 2 is an aft looking forward left hand perspective view illustration of the rear turbine frame illustrated in FIG. 1 and surrounding cooling manifold of the present invention.
Figure 3:
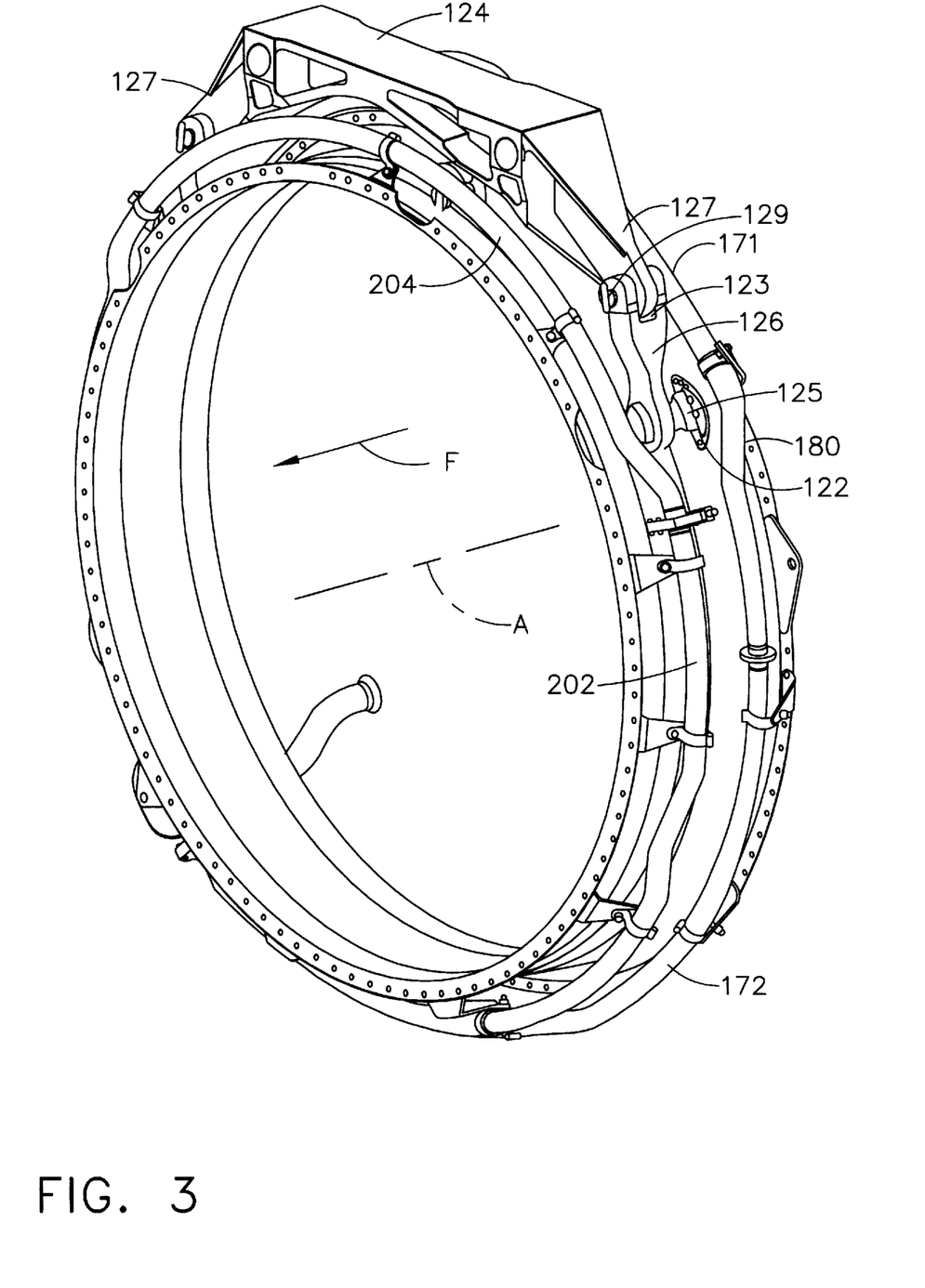
FIG. 3 is an aft looking forward right hand perspective view illustration of the rear turbine frame illustrated in FIG. 1 and surrounding cooling manifold of the present invention.
Figure 4:
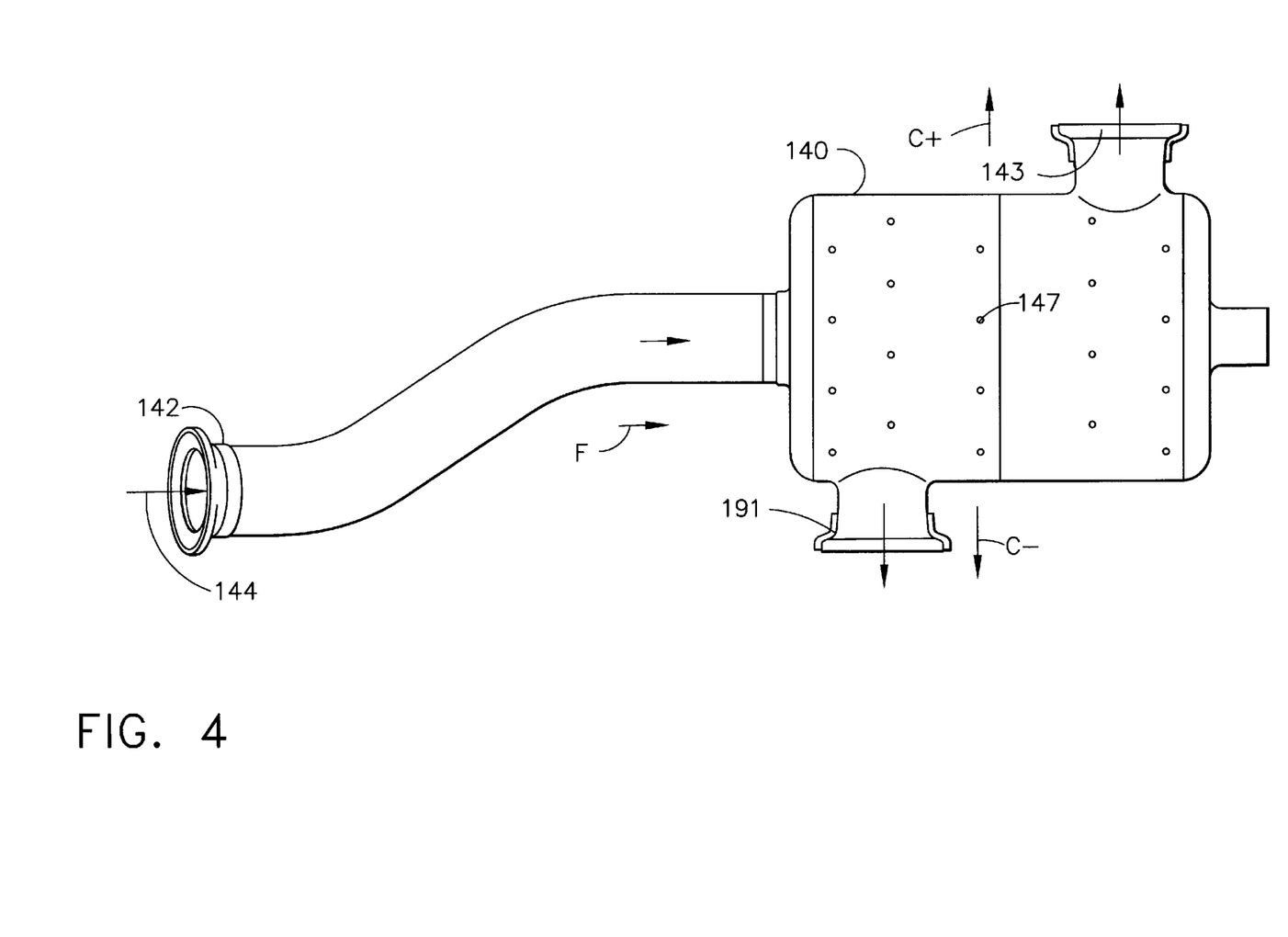
FIG. 4 is a radially outward looking elevated view illustration of a plenum box of the cooling manifold illustrated in FIG. 2.

Referring further to FIGS. 2, 3 and 4, an annular first manifold tube 160 in fluid communication with the plenum box 140 through a first outlet, illustrated as a first flanged port 191, extends in a first circumferential direction C– away from plenum box, and is circumscribed radially outward of and around the centerline A. The annular first manifold tube 160 ends near the plenum box 140 to which it may be attached for structural support. Plenum box impingement cooling holes 147 are disposed through the plenum box 140 to impinge cooling air 144 on the annular frame casing 84.

Referring more particularly to FIGS. 2 and 3, the first manifold tube 160 has first, second, and third arcuate sections 170, 171, and 172, respectively, that are perpendicular to the centerline A and centered in different first, second, and third planes 174, 175, and 176, respectively, that are perpendicular to the centerline A. Transitions bends 180 in the first manifold tube 160 are used to adjust the axial position of the first manifold tube and transition the tube from the first arcuate section 170 to the second and third arcuate sections 171 and 172, respectively, to avoid interference of the first manifold tube 160 with and to effectively cool the first set of U-shaped clevises 122 on the rear turbine frame 62, the set of first links 126, first and second sets of pins 125 and 129, lugs 127 and the platform 124.

Figures 7, 8:
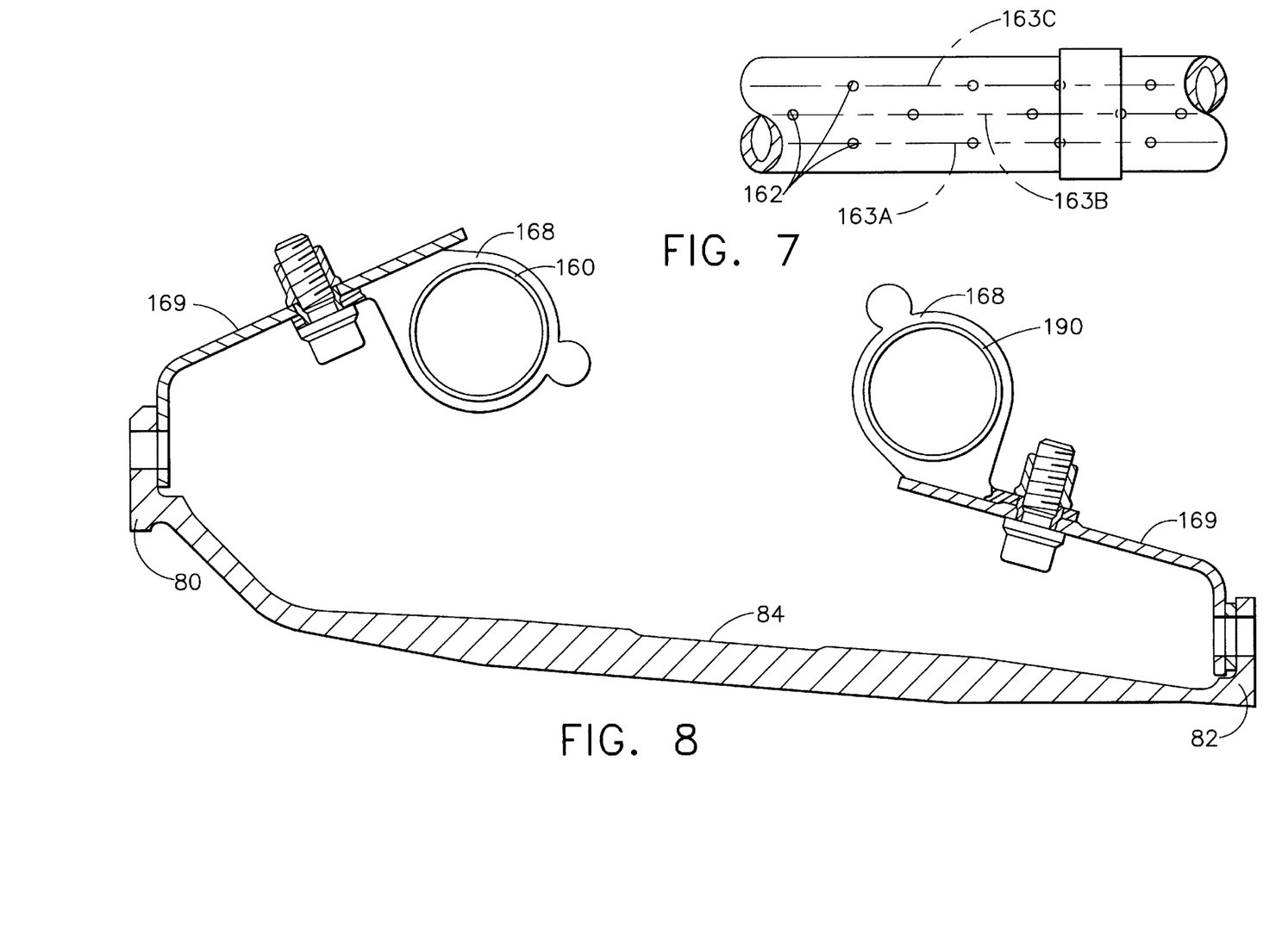
FIG. 7 is a radially outward looking elevated view illustration of an arrangement of impingement cooling holes in the manifold tubes illustrated in FIGS. 2 and 3 as taken along line 7—7 in FIG. 2.
FIG. 8 is a cross-sectional schematic view of loop clamps attached to brackets which are used to support the manifold tubes.

A first plurality of impingement cooling holes 162 illustrated in FIGS. 5 and 7, in the first manifold tube 160, are aimed generally radially inward toward the annular frame casing 84 between the forward and aft flanges 80 and 82, respectively. The first plurality of impingement cooling holes 162 are arranged in a distribution pattern having first, second, and third axially spaced apart arcs of impingement cooling holes 163A, 163B, and 163C, respectively, aimed generally radially inward to impinge along first, second, and third target circles 164A, 164B, and 164C, respectively, on the casing 84 to provide a circumferential even distribution of cooling air on the casing. The impingement cooling holes of the first, second, and third arcs of impingement cooling holes 163A, 163B, and 163C, respectively, are circumferentially equally spaced apart within each arc of impingement cooling holes and 50% staggered with respect to axially adjacent arcs as illustrated in FIG. 7.

An annular second manifold tube 190 spaced axially apart from said first manifold tube 160 and in fluid communication with the plenum box 140 through a second outlet, illustrated as a second flanged port 143, extends in a second circumferential direction C+ away from plenum box, and is circumscribed radially outward of and around the centerline A extends away from the plenum box in a second circumferential direction C– opposite that of the first circumferential direction C+. The first and second outlets being circumferentially spaced apart in circumferentially opposite sides of the plenum box provide a counter flow means to flow cooling air in the first and second manifold tubes in opposite first and second circumferential directions.

Figure 6:
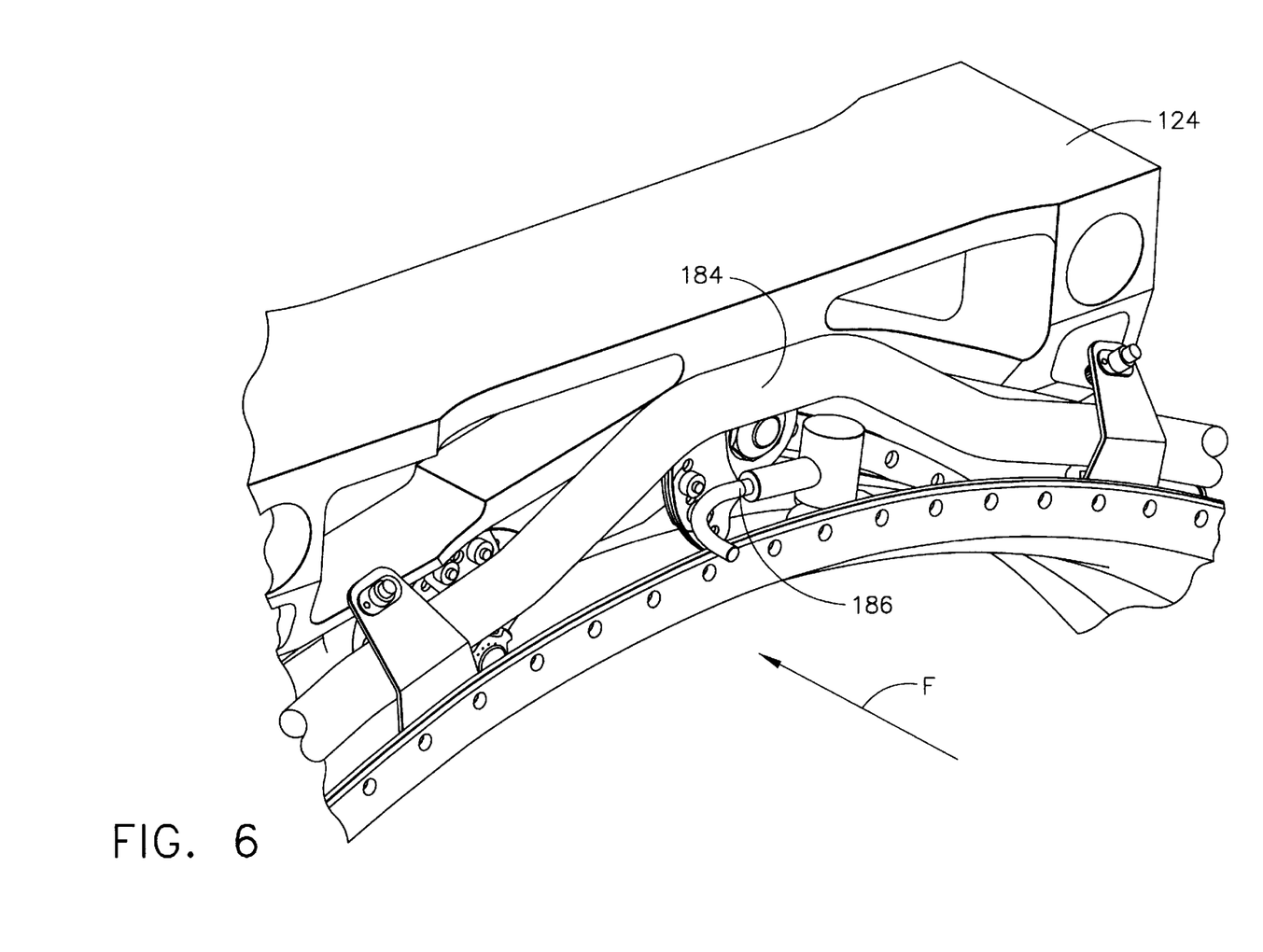
FIG. 6 is a forward looking aft left hand perspective view illustration of a jog in the forward manifold tube around a component mounted on the rear turbine frame illustrated in FIGS. 1 and 3.

The annular second manifold tube 190 is circumscribed radially outward of and around the centerline A. The second manifold tube 190 has fourth and fifth arcuate sections 202 and 204, respectively, are perpendicular to the centerline A and are routed or centered in two different fourth and fifth planes 206 and 208, respectively, that are perpendicular to the centerline A. One of the transitions bends 180 in the second manifold tube 190 transitions the manifold tube from the fourth arcuate section 202 to the fifth arcuate sections 204 to avoid the first set of clevises 122 and the second clevises 123 on the rear turbine frame 62 and the first link 126. Jogs 184 are used to avoid interference with various bosses 186, tubes, and other components of the engine and rear turbine frame as shown in conjunction with a second manifold tube 190 in FIG. 6. A second plurality of impingement cooling holes 192 in the second manifold tube 190 are aimed generally radially inward toward the annular frame casing 84 between the forward and aft flanges 80 and 82. The second plurality of impingement cooling holes 192 are arranged in a distribution pattern having fourth and fifth axially spaced apart arcs of impingement cooling holes 193A and 193B, respectively, aimed generally radially inward to impinge along fourth and fifth target circles 194A and 194B, respectively, on the casing 84 to provide a circumferential even distribution of cooling air on the casing. The distribution pattern of the second plurality of impingement cooling holes 192 also include a sixth arc of impingement cooling holes 193C aimed generally over and aft of the aft flange 82 to impinge on a sixth target circle 194C on a radially outer surface 198 of the nozzle cowl 85 to provide additional cooling of the primary nozzle with an even and uniform distribution of cooling air. The impingement cooling holes of the fourth, fifth, and sixth arcs of impingement cooling holes 193A, 193B, and 193C, respectively, are equally spaced apart within each arc and 50% staggered with respect to axially adjacent arcs. Impingement cooling holes in the second arcuate section 171 and the fifth arcuate section 204 are aimed to impinge on the clevises 122 on the rear turbine frame 62 for cooling purposes.

Referring to FIG. 8, the annular first manifold tube 160 is supported by loop clamps 168 attached to brackets 169 which are bolted or otherwise attached to the annular forward flange 80. The annular second manifold tube 190 is supported by the loop clamps 168 attached to brackets 169 which are bolted or otherwise attached to the annular aft flange 82.

While the preferred embodiment of our invention has been described fully in order to explain its principles, it is understood that various modifications or alterations may be made to the preferred embodiment without departing from the scope of the invention as set forth in the appended claims.

What is claimed is:

1. An apparatus for cooling a gas turbine engine annular turbine frame, said apparatus comprising:
    an annular first manifold tube in fluid communication with a source of cooling air,
    said first manifold tube circumscribed radially outward of and around a centerline,
    said first manifold tube having axially spaced apart first arcuate sections circumscribed about and perpendicular to said centerline, and
    each of said first arcuate sections of said first manifold tube having a corresponding portion of a first plurality of impingement cooling holes disposed through said first manifold tube and aimed generally radially inward.

2. An apparatus as claimed in claim 1 wherein said source of cooling air is a first plenum box having an inlet for receiving cooling air and said first manifold tube is in fluid communication with a first outlet of and extending in a first circumferential direction away from said plenum box.

3. An apparatus as claimed in claim 2 wherein said first plurality of impingement cooling holes includes at least one set of impingement cooling holes disposed along a first set of arcs wherein each of said first arcs lay on one of said first arcuate sections.

4. An apparatus as claimed in claim 3 wherein said first plurality of impingement cooling holes further comprises at least one additional set of impingement cooling holes disposed along at least one additional set of arcs and wherein each of said additional arcs lay on said one of said first arcuate sections axially spaced apart from said first arc on said one of said first arcuate sections.

5. An apparatus as claimed in claim 3 wherein said at least one set of impingement cooling holes are aimed towards a first circumference on the frame.

6. An apparatus as claimed in claim 4 wherein said at least one set of impingement cooling holes are aimed at a first circumference on the frame and said at least one additional set of impingement cooling holes are aimed towards a second circumference on the frame.

7. An apparatus as claimed in claim 6 further comprising a cooling air bleed connected to said plenum box with a selectable on and off control valve therebetween and said cooling air bleed is in fluid communication with at least one stage of a compressor of the engine.

8. An apparatus as claimed in claim 2 further comprising:
    an annular second manifold tube in fluid communication with a second outlet of and extending in a second circumferential direction away from said plenum box,
    said second manifold tube is circumscribed radially outward of and around said centerline and axially spaced apart from and aft of said first manifold tube,
    said second manifold tube having axially spaced apart second arcuate circumscribed about and perpendicular to said centerline, and
    each of said second arcuate sections of said second manifold tube having a corresponding portion of a second plurality of impingement cooling holes disposed through said second manifold tube and aimed generally radially inward.

9. An apparatus as claimed in claim 8 further comprising first and second portions of said first and second pluralities of impingement cooling holes aimed at first and second axially spaced apart circles respectively around the frame wherein said first and second portions of said first and second pluralities of impingement cooling holes are in at least two of said first and second arcuate sections respectively.

10. An apparatus as claimed in claim 9 further comprising a counter flow means to flow cooling air in said first and second manifold tubes in opposite first and second circumferential directions respectively.

11. An apparatus as claimed in claim 10 wherein said first and second manifold tubes are nearly 360° in circumference and extend circumferentially from first and second outlets in said plenum box to first and second manifold tube ends respectively near said plenum box.

12. An apparatus as claimed in claim 11 wherein said counter flow means comprises said first and second outlets being circumferentially spaced apart in circumferentially opposite sides of said plenum box.

13. A cooling system for a gas turbine engine, said apparatus comprising:
    an annular turbine frame having annular structural radially outer and inner rings respectively fixedly connected by a plurality of circumferentially spaced apart struts,
    said outer ring including an annular casing,
    a cooling apparatus for cooling said frame, said cooling apparatus comprising;
    a first plenum box having an inlet for receiving cooling air,
    axially spaced apart annular forward and aft manifold tubes in fluid communication with first and second outlets respectively of said plenum box,
    said forward and aft manifold tubes extending in opposite first and second circumferential directions respectively away from said plenum box,
    said forward and aft manifold tubes circumscribed radially outward of and around a centerline,
    said forward and aft manifold tubes having forward and aft axially spaced apart arcuate sections circumscribed about and perpendicular to said centerline, and each of said arcuate sections of said forward and aft manifold tubes having corresponding forward and aft portions of forward and aft pluralities of impingement cooling holes disposed through said forward and aft manifold tubes and aimed generally radially inward.

14. A cooling system as claimed in claim 13 wherein each of said forward and aft arcuate sections includes sets of impingement cooling holes disposed along corresponding sets of axially spaced apart arcs on said each of said forward and aft arcuate sections.

15. An apparatus as claimed in claim 14 wherein each of said sets of impingement cooling holes is disposed along corresponding each of said sets of axially spaced apart arcs on said each of said forward and aft arcuate sections are aimed towards a corresponding one of a set of circumferences on said annular casing.

16. An apparatus as claimed in claim 15 wherein said frame further comprises clevises for mounting the engine, said clevises mounted on said annular casing, and a first one of said sets of impingement cooling holes in at least a first one of said forward and aft arcuate sections are aimed to impinge on said clevises.

17. An apparatus as claimed in claim 16 further comprising:
  forward and aft flanges on forward and aft ends of said outer casing,
  a nozzle cowl attached to said aft flange,
  a second one of said sets of impingement cooling holes in all of said aft arcuate sections are aimed to impinge along a circle on an outer circumference of said cowl.

18. An apparatus as claimed in claim 17 further comprising a counter flow means to flow cooling air in said first and second manifold tubes in opposite first and second circumferential directions respectively comprising said first and second outlets being circumferentially spaced apart in circumferentially opposite sides of said plenum box.

19. An apparatus as claimed in claim 18 wherein said first and second manifold tubes are nearly 360° in circumference and extend circumferentially from first and second outlets in said plenum box to first and second manifold tube ends respectively near said plenum box.

20. A cooling system for a gas turbine engine, said apparatus comprising:
  an annular turbine frame having annular structural radially outer and inner rings respectively fixedly connected by a plurality of circumferentially spaced apart struts,
  said outer ring including an annular casing disposed between forward and aft flanges,
  a cooling apparatus for cooling said frame, said cooling apparatus comprising;
    a first plenum box having an inlet for receiving cooling air,
    an annular forward manifold tube spaced axially apart from and forward of an annular aft manifold tube in fluid communication with first and forward and aft outlets respectively of said plenum box,
    said forward and aft annular manifold tubes extending in opposite first and second circumferential directions respectively away from said plenum box,
  a counter flow means to flow cooling air in said first and second manifold tubes in opposite first and second circumferential directions respectively,
  said counter flow means comprising said first and second outlets being circumferentially spaced apart in circumferentially opposite sides of said plenum box,
  said forward and aft manifold tubes circumscribed radially outward of and around a centerline,
  said forward manifold tube having three forward axially spaced apart arcuate sections circumscribed about and perpendicular to said centerline,
  said aft manifold tube each having three aft axially spaced apart arcuate sections circumscribed about and perpendicular to said centerline,
  said forward arcuate sections having three corresponding forward portions of forward pluralities of impingement cooling holes disposed through said forward manifold tube and aimed generally radially inward,
  said aft arcuate sections having three corresponding aft portions of aft pluralities of impingement cooling holes disposed through said aft manifold tube and aimed generally radially inward,
  said three forward portions of forward pluralities of impingement cooling holes are circumferentially disposed along corresponding axially spaced apart first, second, and third forward arcs on said each of said forward arcuate sections and aimed at first, second, and third forward circles respectively on said casing circumscribed about said centerline,
  said three aft portions of aft pluralities of impingement cooling holes are circumferentially disposed along corresponding axially spaced apart first, second, and third aft arcs on said each of said aft arcuate sections and aimed at first, second, and third forward circles respectively wherein said first and second forward circles are on said casing circumscribed about said centerline and said third forward circles is on a nozzle cowl attached to said aft flange, and
  clevises for mounting the engine, said clevises mounted on said annular casing, and at least a first one of said three forward portions of forward pluralities of impingement cooling holes in at least one of said forward arcs on said forward arcuate sections are aimed at aimed to impinge on said clevises.

* * * * *